March 21, 1967     E. BARTHOLOMEW     3,310,045
INTERNAL COMBUSTION ENGINE FUEL FEEDING SYSTEM
Filed March 30, 1965     4 Sheets-Sheet 1
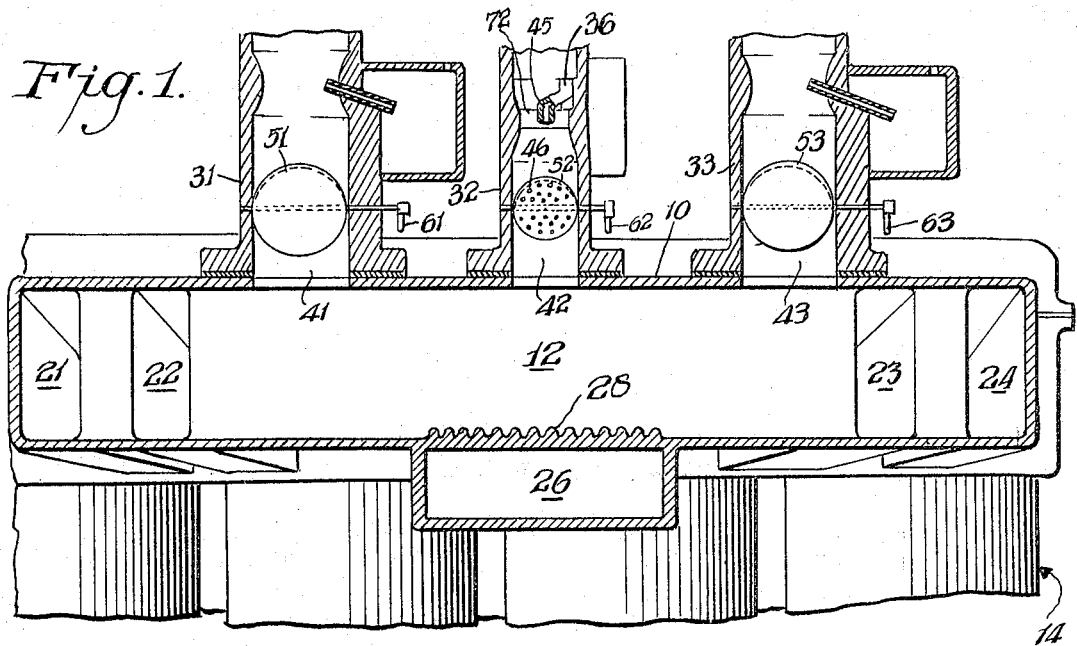
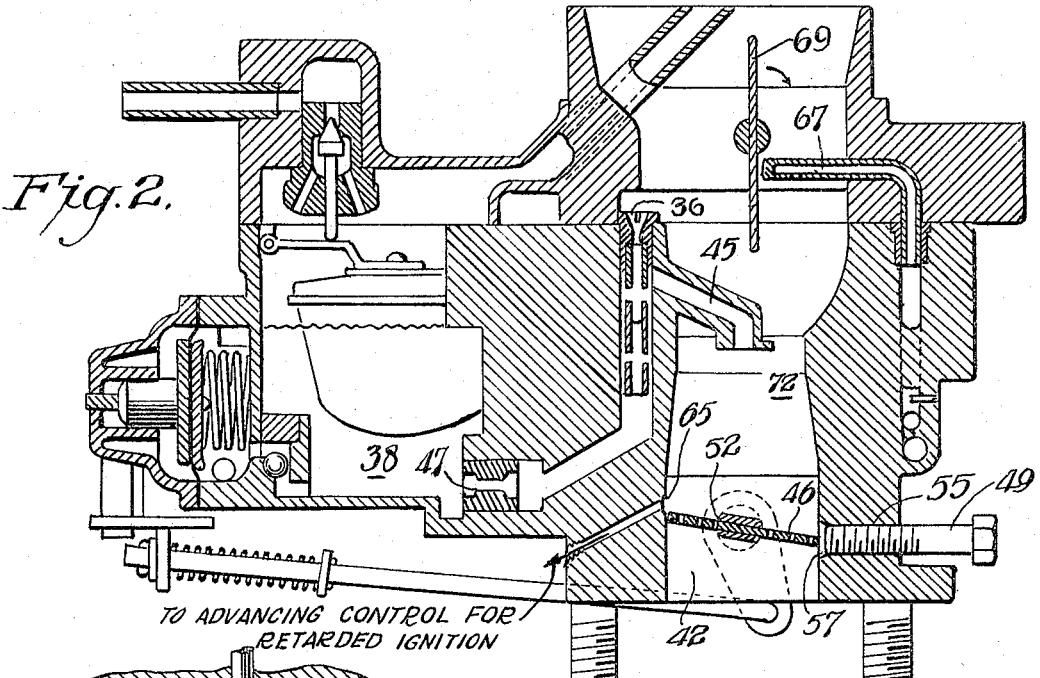
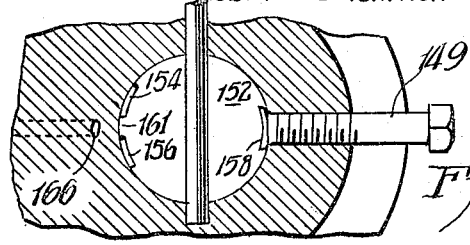
INVENTOR.
Earl Bartholomew
BY Donald L. Johnson
ATTORNEY

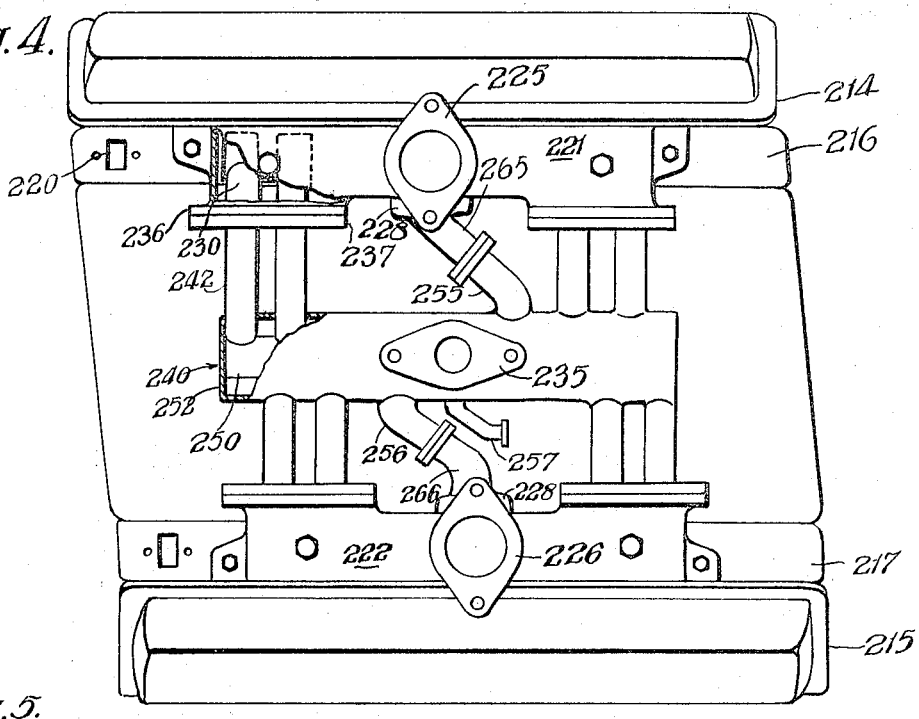

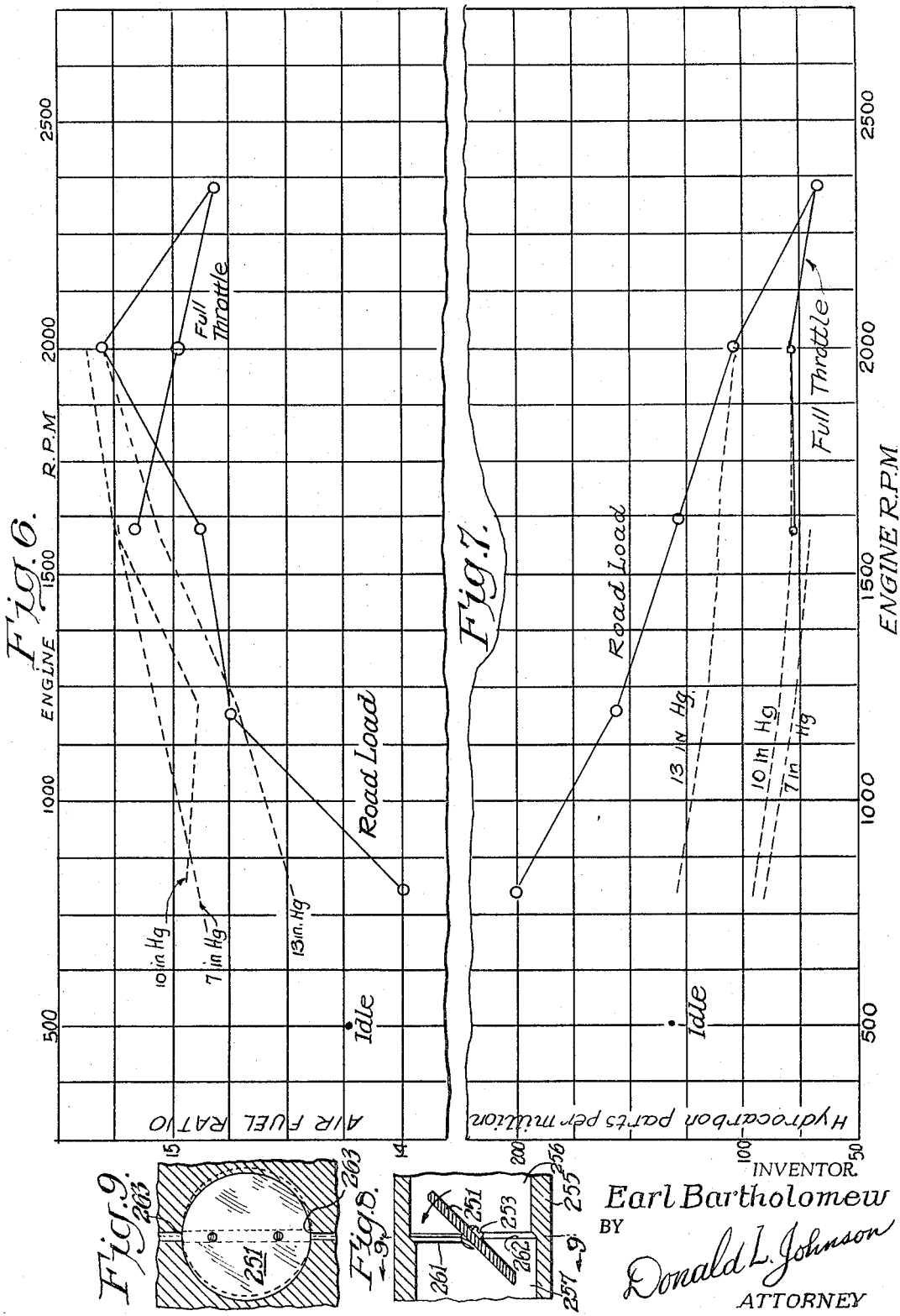

March 21, 1967  E. BARTHOLOMEW  3,310,045
INTERNAL COMBUSTION ENGINE FUEL FEEDING SYSTEM
Filed March 30, 1965  4 Sheets-Sheet 4
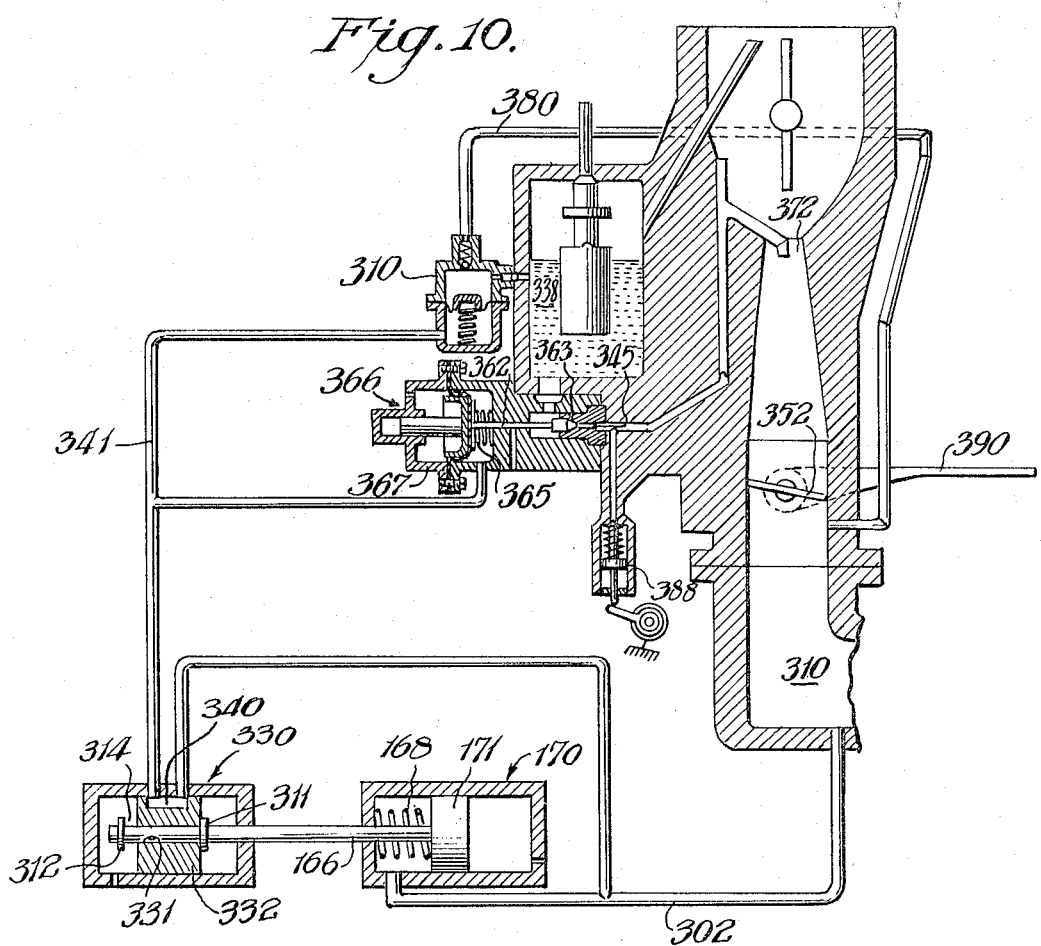
INVENTOR.
Earl Bartholomew
BY
Donald L. Johnson
ATTORNEY

United States Patent Office 3,310,045
Patented Mar. 21, 1967

3,310,045
INTERNAL COMBUSTION ENGINE FUEL
FEEDING SYSTEM
Earl Bartholomew, Birmingham, Mich., assignor to Ethyl Corporation, New York, N.Y., a corporation of Virginia
Filed Mar. 30, 1965, Ser. No. 443,956
17 Claims. (Cl. 123—127)

The present application relates to improved gasoline engines and components and is in part a continuation of applications Ser. No. 314,814, filed Oct. 8, 1963 (now U.S. Patent 3,198,187, granted Aug. 3, 1965), and Ser. No. 408,135, filed Nov. 2, 1964 (now U.S. Patent 3,282,261, granted Nov. 1, 1966).

Among the objects of the present invention is the provision of novel engines that have exceptional efficiency and simple construction, as well as novel components for such engines.

The foregoing as well as additional objects of the present invention will be more fully understood from the following description of several of its exemplifications, reference being made to the accompanying drawings wherein:

FIG. 1 is a somewhat schematic and partly sectional illustration of an engine typical of the present invention;

FIG. 2 is an enlarged detail view in section of a component of the engine of FIG. 1;

FIG. 3 is a horizontal sectional detail of a modified construction pursuant to the present invention;

FIG. 4 is a somewhat schematic plan view with portions broken away of an intake manifold and cylinder block assembly representing a further aspect of the present invention;

FIGS. 5, 6 and 7 are curve diagrams illustrating features of the operation of the construction of FIG. 4;

FIGS. 8 and 9 are respectively vertical and horizontal sectional details of a modified carburetor construction representative of the present invention; and FIG. 10 is a vertical sectional sectional view of another form of carburetor construction in accordance with the present invention.

It has been discovered that a gasoline engine can be operated at very high efficiency with a carburetion assembly having a primary carburetor barrel of relatively small cross-sectional area for low power operation and a secondary fuel mixture supply system having throat means with a relatively large cross-sectional area for high power operation, the primary barrel including a venturi-metered jet that provides idle as well as operating mixture for the low power operations.

The primary carburetor barrel desirably has a trrottle valve that provides a minimum mixture flow passageway with a cross-sectional area at least about 6 to 10% that of its maximum passageway. It is also preferred that the throttle valve be of the butterfly type with a butterfly disk having a multiplicity of small perforations that define the minimum mixture flow passageway.

The foregoing carburetion assembly is particularly effective when used with an engine having a plurality of cylinder banks and an intake manifold with a single intake conduit that is connected to all the cylinders. It is also very advantageous for the ignition system to be constructed so as to retard the ignition about 3 to 6 degrees after top dead center at idle.

Turning now to the drawings, the engine construction of FIG. 1 is of the V-8 type and has an intake manifold 10 with a single intake conduit 12 that is connected to all its cylinders. One bank of four cylinders is indicated at 14, and conduit 12 has branches 21, 22, 23 and 24 that are connected to the intake ports of the respective cylinders of that bank. A similar set of four branches connect conduit 12 to the intake ports of the four cylinders in the second bank, but these have been cut away in the sectional view.

Three different carburetors 31, 32, 33 are shown as mounted on the manifold 10 and arranged to supply an air-fuel mixture to the engine's intake. Carburetor 32 has a throat 42 of relatively small size controlled by a throttle valve 52 of the butterfly type but containing a multiplicity of perforations 46. Carburetors 31, 33 have throats 41, 43 each of somewhat larger size than throat 42 and controlled by imperforate throttle valves 51, 53.

All the throttles are operated by mechanical linkages to throttle arms 61, 62, 63. The linkages are arranged so that at idle and low power engine operation only carburetor 32 is in use, carburetors 31 and 33 then being arranged to have their throttles closed. For power demands greater than can be supplied through carburetor 32, i.e. when the throttle 52 is wide open and still more power is needed, the throttle linkages begin to open throttles 51, 53, bringing carburetors 31 and 33 into play. The engine can then breathe more freely and develop its maximum power.

Heating of the intake manifold can be provided in any desired way but is shown in FIG. 1 as effected by means of a heating passageway 26 extending across the floor of the conduit 12 and connected to exhaust ports in each cylinder bank so as to carry a stream of hot exhaust gases. The floor 28 of conduit 12 above the heating passageway 26 can be ribbed, as indicated, to effectively increase the heat-transfer surface.

Carburetor 32 has a single or multiple venturi 72 arranged to provide sufficient suction to draw fuel from a fuel chamber at the very low air-flow rate that prevails when the engine is idling. The conventional idle fuel jet normally used in carburetors is accordingly not needed so that the construction of carburetor 32 is quite simple. Its venturi 72 will also operate effectively to provide appropriate fuel supply at all higher engine speeds and at all engine loads, particularly if its fuel discharge line 45 has an air bleed 36 such as is more fully illustrated in FIG. 2. The fuel bowl is there shown at 38 with a metering orifice 47 through which the fuel discharge line 45 communicates with bowl 38.

Throttle valve 52 is arranged to seat directly against the walls of throat 42 so that the perforations 46 provide all or nearly all of the by-pass flow required for idling. FIG. 2 also shows an idle adjustment in the form of a threaded plug or screw 49 threadedly engaged in aperture 55 that penetrates through the wall of throat 42. This aperture has a sufficiently large diameter so that where it opens into the interior of the throat it provides a by-pass 57 around the edge of throttle valve 52. Threading the screw 49 further into or out of the aperture 55 decreases or increases the width of the by-pass 57 and accordingly adjusts the idling flow to the engine.

Because the idle fuel-air mixture is formed in the venturi 72, adjustment of screw 49 does not affect the fuel-air ratio. However, it does control the idle speed.

The carburetor of FIG. 2 also has a vacuum take-off port 65 located slightly above the upstream edge of valve 52 to provide a connection for controlling the ignition timing in response to variations in engine operation. The presence of the perforations 46 in the throttle valve 52 does not affect the operation of the vacuum take-off port 65 even though these perforations be very close to the valve edge adjacent that port. In other words, when the throttle is in the closed position, as indicated, no vacuum is applied to port 65. However, the opening of the throttle 52 to the degree that its upstream edge reaches the level of the port 65 or goes higher, will cause the port to be subjected to the vacuum developed in the intake manifold.

The remainder of the construction of the carburetor of FIG. 2 can be conventional and can include an accelerating pump discharge tube 67, a choke valve 69, and the like. Because of the characteristics of the venturi 72, it supplies an appropriate fuel-air mixture for almost all operating conditions when carburetors 31, 33 are out of action. In the arrangement of FIG. 1 it is sometimes helpful for carburetor 32 to also have a supplementary supply of fuel during accelerations. However, there is no need for the usual idle system or for any transitional mixture supply to take care of the usual difficulties when the carburetor moves from idle to high speed operation. A power fuel supply ordinarily used in conventional carburetors to enrich the mixture during high power operation is not absolutely essential in the carburetor 32 if an acceleration pump is provided, but it can be used and when used reduces the amount of acceleration fuel required from an acceleration pump for smoothest operation.

In the interest of simplicity of construction, carburetor 32 can remain in operation at all times, including those when carburetors 31 and 33 each supply fuel-air mixtures. This type of operation is not too important, however, inasmuch as the throat 42 of carburetor 32 is of relatively small size and supplies a small fraction of the fuel-air mixture as compared to combined throats 41, 43 of the remaining carburetors. For example, at 2000 r.p.m. with all carburetor throttles wide open, the carburetor throat 42 supplies only about 14% of the total mixture. Of course, as the throttles 51, 53 of carburetors 31, 33 move toward a more closed position with throttle 52 of carburetor 32 wide open the fraction of mixture supplied by throat 42 will increase.

The restricted size of throat 42 and of its venturi 72 provides an air-flow rate which has a relatively small range, that is a maximum air-flow rate through the throat may be only about ten to fifteen times the minimum air-flow rate. It is this feature which enables venturi 72 to operate satisfactorily throughout that range and thus render it unnecessary to incorporate a separate idle fuel system. This ratio of maximum-to-minimum air-flow rate is made even smaller by retarding the idle ignition timing three to six, preferably five degrees, after top dead center, as described in the parent application Ser. No. 408,135. One of the effects of this ignition retarding is to increase the minimum mixture flow rate at idle and this increase can amount to as much as 60% or thereabouts, without a corresponding change in the maximum air-flow rate. A maximum to minimum range of ten to one can accordingly be reduced to about six to one by the idle ignition retarding.

The carburetors 31 and 33 can also be of relatively simple construction. They have no idle fuel-supply requirement and can in general operate like standard secondary carburetor barrell of a four-barrell carburetor system. A simple venturi system without an idle jet is accordingly all that is needed for these carburetors.

The carburetors 31, 33 need not be separate but can be combined as a single secondary carburetor of suitably large throat size, or can even be replaced by a fuel injection mechanism or any other fuel supply device that provides a breathing throat sufficiently large to permit the engine to develop its maximum power.

FIG. 3 shows a modified construction for the throttle valve of carburetor 32. In the construction of FIG. 3 the throttle valve 152 is also in the general shape of a disc but it has marginal cut-outs 154, 156 and 158 in place of the perforations 46 of FIGS. 1 and 2. Cut-out 158 can be arranged to coact with adjusting screw 149 so that the adjusting action of this screw can partially or essentially completely obstruct this cut-out. Indeed, cut-out 158 can be made large enough so that no further cut-outs are needed. If used, however, supplemental cut-outs can be located anywhere along the margin except that they should not interfere with the proper operation of a vacuum take-off. In FIG. 3, for example, the vacuum take-off passage is indicated at 166, and cut-outs 154, 156 are spaced apart so as to leave an uninterrupted margin 161 by means of which the valve disc 152 will suitably control the vacuum take-off.

It is preferred to have at least one of the cut-outs at the downstream portion of the valve disc 152. This facilitates prompt flow into the intake system of any liquid fuel discharged from the venturi and impinging on the throttle disc.

The carburetion assembly of the present invention is also very effectively used in combination with a dual manifold type of induction system such as is described for example in U.S. patent applications Ser. No. 301,249, filed Aug. 12 1963 (abandoned but replaced by Ser. No. 445,856, filed Mar. 29, 1965, now United States Patent 3,250,264, granted May 10, 1966; as well as in Ser. No. 314,814 and Ser. No. 408,135 referred to above. An engine with this type of combination is illustrated in FIG. 4. This engine is also of the V–8 type, one cylinder block being shown at 214 and the other at 215. The cylinder head of each bank of cylinders has an intake face 216, 217 respectively, through which the intake ports of the individual cylinders open along with water circulation passageways such as at 220, and an exhaust passageway that provides exhaust gases for heating the induction system.

In the embodiment of FIG. 4 two different secondary intake manifolds 221, 222 are separately secured directly to the respective head faces 216, 217. Each secondary manifold has its own carburetor mounting flange 225, 226 for separately receiving a secondary carburetor of relatively large throat size. The secondary manifolds may be of simple box-like shape with four outlets, each arranged to mate with the intake faces around the intake ports.

Heating chambers, such as shown at 228, can be in heat exchange relation with each secondary manifold and be open to receive the exhaust gases from the exhaust port on the face to which its manifold is secured. At each intake port the secondary manifolds also have relatively small primary discharge tubes 230 which project through the secondary manifold for connection to a primary intake manifold as by means of mounting flanges 236.

The primary intake manifold shown at 240 has a set of exit tubes 242 branching from a main runner 250 and disposed for connection to the respective discharge tubes 230 as by means of flanges 237 that mate against flanges 236. The flanges 236 and 237 can be secured together as by bolts that are not shown in the figure.

A heating jacket 252 surrounds the main runner 250 of the primary manifold and has two heat-supply conduits 255, 256 as well as a heat exhaust conduit 257. The respective heat-supply conduits 255, 256 are connected to similar supply conduits 265, 266 which open from the heating chambers 228 of the secondary manifolds 221, 222. A carburetor mounting flange 235 is provided on the primary manifold for receiving the primary carburetor with its relatively small throat. The carburetors of FIG. 1 can be used in the construction of FIG. 4 and can be operated in the way described in connection with FIG. 1.

The heat exhaust conduit 257 can be connected to the usual exhaust system so as to permit the exhaust gases to flow through and out of all the intake manifold heating passages. In this way these gases are arranged to continually move through the heating passages and a very good heat supply is provided.

In the combination of FIG. 4 the desirable features of the carburetor assembly are further heightened by the dual intake manifold assembly. The smoother operation and the lowering of the concentration of undesirable products in the engine exhaust resulting from the carburetor assembly as explained in Ser. No. 314,814, is further improved by the dual intake manifold system by reason of the further increase in mixture uniformity obtained in the small primary intake manifold.

FIGS. 5, 6 and 7 demonstrate the improved results thus obtained in a standard 1964 production engine having 389 cubic inches displacement, a primary carburetor throat 1.10 inches in diameter, two secondary carburetors each with a throat 1.75 inches in diameter and the principal portions of the respective manifolds having a cross-sectional area about equal to that of the carburetor throat from which it is supplied. The engine was operated with the standard type of ignition system having its ignition timed at 6° after top dead center at idle.

FIG. 5 charts the carbon monoxide content of the exhaust gases with the engine operating only through the primary manifold system and the air-fuel ratio adjusted to about 14.23 at idle. The carbon monoxide content was 1.0% at idle, dropping to below 0.8% under road load operation with the full throttle figure down to 0.3%. Under extra load, as for example climbing upgrade, the carbon monoxide content was even lower at full throttle. The maximum speed on level road was over 69 miles per hour. All of the above are shown by the full lines in FIG. 5. The dash lines labeled "7 in. Hg," "10 in. Hg" and "13 in. Hg" give the carbon monoxide content in the exhaust with the engine loaded by a dynamometer and operated with different throttle settings that produce the three levels of vacuum in the intake manifold. The primary and secondary intake manifolds are internally connected to each other by way of the respective cylinder intake ports, and since the throttles of the secondary carburetors were kept closed during the foregoing operation, the pressure in the primary manifold was essentially the same as the pressure in each of the secondary intake manifolds.

FIG. 6 shows the air-fuel ratios during the operations described in connection with FIG. 5. The richest ratio is just slightly richer than 14:1 and the full throttle ratio at least as high as 14.8:1.

The hydrocarbon content in the exhaust is charted in FIG. 7 for the same operation as in FIGS. 5 and 6. At idle the hydrocarbon content was about 132 parts per million. At the maximum road load speed obtainable with the small carburetor, the hydrocarbon content was only 68 parts per million. During other modes of operation the hydrocarbon content was between these two values except for very low speed road load operations, when it rose to about 200 parts per million.

In general it is preferred to have a primary carburetor available with a throat area cross-section from 0.1 to 0.2 square inch per 100 cubic inches of engine displacement for an 8-cylinder engine and from 0.3 to 0.4 square inch for engines with a smaller number of cylinders regardless of whether the intake manifold system is of the dual type, as illustrated in FIG. 4, or of the type shown in FIG. 1, for example. The combined cross-sectional area of the secondary supply throat is preferably between 0.5 and 1.5 square inches per 100 cubic inches of engine displacement. The more constricted the primary carburetor is, the lower is the maximum speed and maximum power available from the engine before the secondary fuel supply is required.

With secondary fuel mixture supplies of relatively large size there may be a significant amount of leakage past the secondary throttles, and such leakage would tend to dilute with air the combustion mixture supplied by the primary carburetor. Such leakage should be as nearly equal as possible for the secondary carburetors. A suitable selection of the fuel jet and air bleed in the primary carburetor can be arranged to compensate for such leakage. This requires a larger ratio of air bleed to fuel jet size compared to the ratio needed with no leakage. However, for some purposes it may be desirable to reduce the leakage as much as possible.

FIGS. 8 and 9 illustrate a modified throttle valve that will greatly reduce such leakage in the secondary carburetors. The throttle valve shown here at 251 is of the disk type pivoted at 253 in an offset type of throat 255. Throat 255 has two cylindrical portions 256, 257 joined together in slightly offset relation to define ledges 261, 262 against which the ends of the throttle disk seat when the throttle is closed. The throttle edges can then be readily shaped so as to accurately seat against the ledges and there is effectively no leakage except around the journal sites 263 at which the throttle disk is pivoted.

It is also advantageous to reduce leakage by making the valve disk of a material having the same coefficient of thermal expansion as that of the material against which it closes. Cast iron is a very desirable material for the throttle body. The throttle valve should be made of a material having the same coefficient of expansion as cast iron, such as an iron-nickel alloy containing about 60% nickel. A chromium stainless steel having about 17% chromium and 0.75% molybdenum is also a satisfactory material. Bronze or brass are also suitable construction materials when used for both of these members.

The dual intake manifold combinations, as shown for example in FIG. 4, desirably incorporate a supplemental fuel pump to supply a little extra fuel to the secondary intake manifold when the secondary throttles are opened. Such supplemental fuel pumps need not operate as conventional acceleration pumps after the secondary throttles are opened, that is further accelerations initiated after such openings are effected quite smoothly and promptly without additional pumping. Such action is more completely described in the above-identified three earlier patent applications to which reference can be made for a more complete description.

The induction systems of the present invention can also be used with the fuel cut-off and/or throttle checking arrangements described in the above-identified three earlier patent applications, and the contents of those applications are incorporated herewith as though fully set forth herein. Such combinations that include the fuel cut-off and/or throttle checking are particularly helpful in motors used to propel automobiles having all-mechanical, i.e. manual, transmissions. FIG. 10 illustrates a carburetor having a simplified arrangement for effecting fuel cut-off.

In FIG. 10 the carburetor is of the general type shown in FIG. 2 using only a single fuel jet 345 operated by venturi 372 and equipped with a shut-off valve 366. A suction line 302 which can be connected to the interior of the intake manifold 310 or to the carburetor throat below the throttle valve 352 is connected to supply suction to cut-off valve 366 and thereby cause it to close the fuel supply to jet 345. To this end valve 366 has a valve pin 362 biased as by spring 365 so that it is urged into open or fuel-supplying position, and a pneumatically operated head 367 is connected to the suction line in such a way that the application of suction forces valve pin 362 into the seated or fuel obstructing position against a seat 363. Connection between the pneumatic head 367 and the suction line 302 is provided by a slide valve 330 and a pneumatic cylinder 170. Cylinder 170 has a piston 171 fitted to be moved to the left, as seen in FIG. 10, to compress a biasing spring 168 when the vacuum in line 302 reaches a magnitude at which fuel cut-off is to be effected. A piston rod 166 carried by piston 171 penetrates into slide valve 330, and passes loosely through a passageway 331 in a valve block 332 slidably fitted into the slide valve. Collars 311, 312 can be carried by the piston rod and can have a fixed or adjustable location on the rod to engage and move the slide block with a lost motion gap indicated by the spacing 314. The valve block 332 has a recess 340 by which it connects suction line 302 to cut-off control line 341 when pneumatic cylinder 170 is actuated by manifold suction and pushes the block to the left-hand position in which it is illustrated in FIG. 10. When this takes place the suction causes the cut-off valve 366 to stop the flow of fuel. As soon as the manifold suction is reduced in intensity sufficiently to cause the pneumatic cylinder 170 to pull the valve block 332 to the right so that it exposes control line 341 to the atmosphere, the suction in valve head 367 is relieved and valve pin 362 is retracted into inoperative position, permitting fuel to flow again.

In the construction of FIG. 10 suction control line 341 is also connected to operate a supplemental fuel pump 310. The supplemental pump is arranged to be cocked by the application of suction to withdraw fuel from the carburetor bowl 338 when the fuel is cut off from the jet 345. At the end of the fuel cut-off interval the suction in control line 341 is relieved, causing pump 310 to squirt a charge of fuel into an outlet conduit 380 that delivers the pumped fuel to the carburetor throat.

The carburetor of FIG. 10 also has a thermostatically controlled variable air bleed 388 to automatically adjust the richness of the mixture to the ambient temperature before and during warm-up, as described in the foregoing three prior patent applications. This is a refinement not needed to bring out the other aspects of the present invention, but it is a relatively simple modification that does not materially complicate the carburetor.

Throttle checking, when desired, can be applied in any convenient way as to a throttle arm 390.

Obviously many modifications and variations of the present invention are possible in the light of the above teachings. It is, therefore, to be understood that within the scope of the appended claims the invention may be practiced otherwise than as specifically described.

What is claimed is:

1. A carburetion assembly having a primary carburetor barrel of relatively small cross-sectional area for low power operation and a secondary fuel mixture supply system having throat means with a relatively large cross-sectional area for high power operation, the primary barrel including a venturi-metered jet that provides all idle as well as operating mixture for the low power operations, said primary barrel being provided with a throttle valve therein, and the cross-sectional areas of the primary and secondary systems being such that when both are wide open the primary system supplies not more than about 14% of the total fuel mixture.

2. The combination of claim 1 in which the primary barrel has a throttle valve that provides a minimum flow passageway with a cross-sectional area at least about 6% that of its maximum flow passageway.

3. The combination of claim 1 in which the primary barrel has a butterfly throttle valve with a butterfly disc containing a multiplicity of small perforations that provide idle mixture flow.

4. The combination of claim 1 in which the venturi-metered jet includes an air bleed.

5. A gasoline engine having an induction system that contains a primary carburetor barrel of relatively small cross-sectional area for supplying combustion mixture for low power operation of the engine, and a secondary mixture-supplying system for supplying combustion mixture for high power operation of the engine, the primary barrel including a venturi-metered fuel jet that supplies all idle as well as operating combustion mixture, said primary barrel being provided with a throttle valve therein, and the cross-sectional areas of the primary and secondary systems being such that when both are wide open the primary system supplies not more than about 14% of the total fuel mixture.

6. The combination of claim 5 in which the engine has an ignition system connected to be retarded 3 to 6 degrees after top dead center, at idle.

7. The combination of claim 5 in which the primary barrel has a butterfly throttle valve with a butterfly disc containing a multiplicity of small perforations that provide idle mixture flow.

8. The combination of claim 5 in which the venturi fuel jet includes an air bleed.

9. The combination of claim 5 in which the engine has a plurality of cylinders and the induction system is of the dual manifold type containing a manifold of relatively small cross-sectional area connected for supplying combustion mixture to all the cylinders from the primary carburetor barrel, and manifold means of relatively large cross-sectional area connected to supply secondary combustion mixture to all the cylinders.

10. The combination of claim 5 in which the engine has a plurality of cylinder banks and an intake manifold with a single intake conduit that is connected to all the cylinders.

11. The combination of claim 10 in which the engine has an ignition system connected to be retarded 3 to 6 degrees after top dead center, at idle.

12. A carburetion assembly having a primary carburetor barrel of relatively small cross-sectional area for low power operation and a secondary fuel mixture supply system having throat means with a relatively large cross-sectional area for high power operation, the primary barrel having (a) a venturi jet that provides all idle combustion mixture, and (b) a butterfly throttle valve, said valve having a butterfly disc with a multiplicity of small idle mxture flow perforations.

13. The combination of claim 12 in which the venturi-metered jet includes an air bleed.

14. A carburetor having a venturi jet that provides all the fuel for idle operation, a butterfly throttle valve downstream of the jet and connected to seat in closed position against a throttle bore, the valve being perforated for passage of idle fuel therethrough, said bore having a pocket spanning a section of its interior where the butterfly seats to provide a by-pass around the throttle valve, and an adjustment member adjustably positioned in said pocket to vary the amount of by-pass.

15. An induction manifold combination having a first generally linear section with securing means for securing that section to the intake port face of a cylinder bank, said section having an inlet intermediate its ends through which it receives combustion mixture and having outlets through which it delivers the combustion mixture essentially only to the cylinders in that bank, a second generally linear section with securing means for securing the second section to the intake port face of a different cylinder bank, said section also having an inlet intermediate its ends through which it receives combustion mixture and having outlets through which it delivers the combustion mixture essentially only to the cylinders of the second bank, said sections having mixture passageways of substantially the same cross-sectional area, and a third section connected to the first and second sections and having mixture passageways with a cross-sectional area markedly smaller than those of the first two sections, the third section having a generally linear portion with a primary carburetor connection intermediate its ends and runners branching off to the intake ports of all the cylinders in both banks, substantially the entire generally linear portion of the third section being jacketed for heating, only a relatively small hot spot heater being incorporated at the inlets in each of the first and second sections, and the first and second sections being disconnected from each other except for any interconnection provided by the third section.

16. A sequentially firing V-type multicylinder gasoline engine having a manifold induction system with a single common passageway branching to all cylinders, and a three-barrel carburetion system in which one barrel is connected as a primary carburetion means for low power operation of all cylinders and the other two barrels are connected as a secondary carburetion means for high power operation, the primary barrel having a venturi-metered jet which provides all idle as well as operating mixture for the low powered operation, and the primary barrel having a venturi with a cross-sectional area which is a small fraction of the combined areas of the secondary barrels and is from about 0.1 to 0.2 square inch for every 100 cubic inches of total piston displacement.

17. The combination of claim 16 in which the engine is a V-eight.

References Cited by the Examiner
UNITED STATES PATENTS

| | | | |
|---|---|---|---|
| 1,226,479 | 5/1917 | Disturnal | 261—41.3 |
| 1,277,705 | 9/1918 | Disturnal. | |
| 1,450,628 | 4/1923 | Flannery. | |
| 1,464,713 | 8/1923 | Johnston | 123—119 X |
| 1,651,250 | 11/1927 | Brownback. | |
| 1,916,952 | 7/1933 | Heitger. | |
| 2,080,440 | 5/1937 | Scott | 261—65 |
| 2,098,424 | 11/1937 | Kolimbat | 123—52 |
| 2,193,533 | 3/1940 | Kishline | 261—23.1 |
| 2,317,625 | 4/1943 | Mallory | 123—127 |
| 2,355,716 | 8/1944 | Ericson | 123—127 |
| 2,430,693 | 11/1947 | Udale | 123—127 |
| 2,640,472 | 6/1953 | Bicknell | 123—127 |
| 2,698,613 | 1/1955 | Jagersberger | 123—119 |
| 2,705,942 | 4/1955 | Braun | 123—127 |
| 2,771,864 | 11/1956 | Caris | 123—52 |
| 2,967,514 | 1/1961 | Riester | 123—127 X |
| 2,989,956 | 6/1961 | Drinkard | 123—52 |
| 3,018,767 | 1/1962 | Sailler | 123—52 X |
| 3,030,085 | 4/1962 | Read | 261—23.1 |
| 3,037,493 | 6/1962 | Burch | 123—52 |
| 3,171,395 | 3/1965 | Bartholomew | 123—127 |
| 3,205,879 | 9/1965 | Von Seggern et al. | 123—127 |

MARK NEWMAN, *Primary Examiner.*

KARL J. ALBRECHT, *Examiner.*

A. L. SMITH, *Assistant Examiner.*